(12) United States Patent
Thompson

(10) Patent No.: US 6,543,282 B1
(45) Date of Patent: Apr. 8, 2003

(54) AIR FLOW DETECTION APPARATUS

(75) Inventor: Luke P. Thompson, Madison, WI (US)

(73) Assignee: Research Products Corporation, Madison, WI (US)

( * ) Notice: Subject to any disclaimer, the term of this patent is extended or adjusted under 35 U.S.C. 154(b) by 0 days.

(21) Appl. No.: 09/842,486

(22) Filed: Apr. 25, 2001

(51) Int. Cl.⁷ .............................................. G01F 1/68
(52) U.S. Cl. ................................................ 73/204.15
(58) Field of Search ....................... 73/204.15, 204.14, 73/204.12, 204.22; 123/494; 219/494

(56) References Cited

U.S. PATENT DOCUMENTS

| | | | |
|---|---|---|---|
| 4,059,982 A | * 11/1977 | Bowman | ................... 374/44 |
| 4,686,450 A | 8/1987 | Pichat | |
| 4,733,559 A | 3/1988 | Aine et al. | |
| 5,212,983 A | * 5/1993 | Ott et al. | ............... 73/204.14 |
| 5,710,380 A | 1/1998 | Talley et al. | |
| 6,125,695 A | * 10/2000 | Alvesteffer et al. | ...... 73/204.27 |

* cited by examiner

*Primary Examiner*—Hezron Williams
*Assistant Examiner*—Jewel V. Thompson
(74) *Attorney, Agent, or Firm*—Andrus, Sceales, Starke & Sawall, LLP

(57) ABSTRACT

An air flow detection apparatus useful in operating an accessory item in an HVAC system includes a sensor printed circuit board assembly having a first thermistor adapted to be exposed to an air flow and associated with a first pair of heating resistors. A second thermistor is placed in parallel with the first thermistor and is adapted to be hidden from the air flow and is associated with a second pair of heating resistors. A control printed circuit board assembly is interconnected with the sensor printed circuit board assembly and has a voltage regulator circuit for applying a DC voltage source to a power regulator circuit and a sensor monitoring circuit interfaced therewith. The power regulator circuit enables the first thermistor and the second thermistor to be heated to a target temperature greater then a highest specified operating ambient temperature and maintains a temperature of the second thermistor regardless of the actual ambient temperature, and the sensor monitoring circuit responds to the cooling of the first thermistor in the presence of air flow to output a signal operating the HVAC accessory item.

9 Claims, 4 Drawing Sheets

AIR FLOW DETECTION APPARATUS

FIELD OF THE INVENTION

This invention relates broadly to fluid flow detection and, more particularly, pertains to air flow detection so as to control the operation of an accessory item in a blower-driven heating, ventilating or air conditioning (HVAC) system.

BACKGROUND OF THE INVENTION

Operation of duct-mounted HVAC accessories, such as electronic air cleaners, humidifiers, dehumidifiers and UV light units, is often dictated by whether the HVAC system blower is running. The assignee of this application has traditionally employed their Model 50/51 Relay for detecting the status of the HVAC blower. The Model 50/51 Relay is a combination transformer and relay that activates when it senses current to the blower motor. The Model 50/51 Relay interfaces by way of a two-wire design to the HVAC blower by clamping around the return lead of the blower motor. The two wire interface allows a current to flow to the accessory item whenever there is current to the blower motor. Although this device has been satisfactory for powering many accessory items when the blower operates, it requires additional wiring to an external device that interfaces in the HVAC blower.

An alternative method of detecting when the blower is operating involves sensing of the actual air flow in the HVAC duct in a manner which eliminates the aforementioned external wiring. However, such method must be capable of detecting air flow over a wide range of and at extreme temperatures.

One method of interest is the dissipation contrast method. This method relies on the principle that heat dissipation is directly related to the speed of air flowing over a heat source. This method most commonly uses a pair of temperature sensing elements that are each exposed to a heat source. One element is in the air stream while the other, acting as a reference, is hidden from the air stream. If the sensors have the same response characteristics, the speed of the air stream can be derived from the difference in output from each of the sensing elements. Some examples of methods using variations of this embodiment are summarized below. Each of the following are well known methods of either sensing the presence of air flow or actually measuring the speed of the air stream;

Anemometer

The thermal or hot wire anemometer consists of a heated RTD, thermocouple junction, or thermistor sensor constructed at the end of a probe; it is designed to provide a direct, simple method of determining air velocity at a point in the flow field. The probe is placed into an airstream and the movement of air past the electrically heated velocity sensor tends to cool the sensor in proportion to the speed of the air flow. Often the sensor probe also incorporates an ambient temperature-sensing RTD or thermistor, in which the indicated air velocity is "temperature compensated" to "standard" air density conditions (typically 0.0748 pounds per cubic foot).

Scientific Technologies, Inc.-Calorimetric Method

Scientific Technologies employs two methods of calorimetric thermal dispersion mass flow monitoring. In the constant power method, the calorific power of the body is kept constant. The volume flow is determined by measuring the temperature difference between two sensors. In the constant temperature difference method, the temperature difference between two sensors is kept constant. The volume flow is determined by measuring the calorific power required to maintain the temperature difference.

Texas Instruments (TI) Solid State Vane Switch

Texas Instruments' Klixon 2 SE Solid State Vane Switch uses a positive temperature coefficient (PTC) temperature sensor to provide air flow sensing. The PTC sensor remains at a low, relatively constant level of resistance over a wide temperature range then abruptly increases resistance at an elevated temperature known as the anomaly temperature. As the transition is approached, a slight temperature rise causes a dramatic increase in resistance. The TI sensor uses the PTC sensor for air flow detection in the following manner. Power is supplied to the PTC to cause it to self heat to a high resistance condition. Sufficient air flow will cool the sensor to its low resistance level. Insufficient air flow allows the sensor to self heat and reach a high resistance state. This resistance change and accompanying change in current is used to trigger an output corresponding to air flow present or not present.

U.S. Pat. No. 4,686,450.

U.S. Pat. No. 4,686,450 discloses an embodiment in which two sensor elements are used to detect air flow by generating a differential output that can be related to the speed of the airstream. The unique feature of this embodiment is a voltage reference that varies predictably with temperature to provide temperature compensation.

U.S. Pat. No. 5,710,380.

U.S. Pat. No. 5,710,380 discloses an embodiment in which a sensor element is heated to an elevated temperature above ambient. Once the elevated temperature is reached, the heat source is terminated and a sensor element is expected to cool. The rate of cooling is proportional to the speed of the air stream.

U.S. Pat. No. 4,733,559.

U.S. Pat. No. 4,733,559 discloses an embodiment in which two sensor elements are arranged in proximity to a heat source. The arrangement is such that one sensor will be upstream of the heater and the other will be downstream. When there is no air flow, the sensor outputs will be balanced. It is expected that an output differential will exist between the two sensing elements when air flow is present. The differential is a result of the upstream sensor being cooled by the air stream while the downstream sensor element is warmed by heat dissipated in the air stream.

The problem with traditional thermal dissipation methods of the type described above is that it is not possible to distinguish between large changes in ambient temperature and changes in air flow. One method that is often useful in handling variations in ambient temperature is to use a reference sensor that is not exposed to the air stream as a baseline for comparison. In this method, the sensor elements are heated to some temperature above ambient (it is assumed that the air stream being detected will be at ambient temperature and will provide a cooling effect). This method works well for compensating for changes in ambient conditions. However, a problem with this method exists that is specific to the HVAC accessory application. The problem lies in the fact the temperature of the air stream being detected is often different from ambient. This condition would be difficult of an application where the HVAC accessory equipment is installed in an unconditioned space (attic or garage). For this type of installation, the accessory equipment is exposed to widely varying ambient temperatures while the air and the duct is near the temperature of the conditioned living space. For very cold ambient conditions, it is not sufficient to heat the sensor elements to just any fixed differential above ambient because the air stream will be likely even warmer yet. For the case where the air stream being detected is warmer than the heated sensing element, the predicted cooling effect will not exist.

Accordingly, it would be desirable to provide an improved device for detecting air flow in HVAC applications over a wide range of temperatures which overcomes the problems discussed above.

SUMMARY OF THE INVENTION

It is a general object of the present invention to provide air detection apparatus for sensing air flow in HVAC systems so as to control the operation of accessory items mounted therein.

It is one object of the present invention to provide an air detection apparatus which will function efficiently even though the temperature of an air stream being detected is different from the ambient temperature.

It is an additional object of the present invention to provide an air detection apparatus which heats sensor elements to a target temperature greater than the highest specified operating ambient temperature.

It is a further object of the present invention to provide an air detection Up apparatus which uses a combination of self-heating and external heating of sensor elements in order to compensate for wide variations in ambient temperature.

It is also an object of the present invention to provide an air detection apparatus which is easier to install requiring less wiring and no interface with a blower motor and which can be installed in a door assembly on the accessory item.

In one aspect of the invention, an air flow detection apparatus is provided which is useful in operating an accessory item in an HVAC system. The apparatus includes a sensor printed circuit board assembly having a first thermistor adapted to be exposed to an air flow associated with a first pair of heating resistors, and a second thermistor in parallel with the first thermistor adapted to be hidden from the air flow and associated with a second pair of heating resistors. A control printed circuit board assembly is interconnected with the sensor printed circuit board assembly and has a voltage regulator circuit for applying a DC voltage source to a power regulator circuit and a sensor monitoring circuit interfaced therewith. The power regulator circuit enables the first thermistor and the second thermistor to be heated to a target temperature greater than a highest specified operating ambient temperature and maintains the temperature of the second thermistor regardless of the actual ambient temperature. The sensor monitoring circuit responds to the cooling of the first thermistor in the presence of air flow to output a signal operating the HVAC accessory item. The power regulator circuit includes a differential amplifier outputting through a first transistor to control the temperatures of the first thermistor and the second thermistor. The sensor monitoring circuit includes an operational amplifier outputting to a second transistor to sense the difference in temperature between the first thermistor and the second thermistor in the presence of air flow. The power regulator circuit applies a common voltage across a first branch defined by the first thermistor and the first pair of heating resistors, and a second branch defined by the second thermistor and the second pair of heating resistors. The first pair of heating resistors are in parallel and the second pair of heating resistors are in parallel.

In another aspect of the invention, an air flow detection apparatus for operating an accessory item in an HVAC system includes a sensor circuit board assembly and a control circuit board assembly interconnected with the sensor circuit board assembly and having a voltage regulator circuit for supplying a voltage source to a power regulator circuit and a sensor monitoring circuit interfaced therewith. The sensor circuit board assembly has a first branch including a first thermistor connected with a pair of parallel heating resistors, and a second branch including a second thermistor connected with a second pair of heating resistors. The sensor circuit board assembly is enclosed in a sensor housing having a first chamber exposed to an air flow for holding the first branch, and a second chamber hidden from the air flow for holding the second branch. The sensor housing is adapted to be mounted on the accessory item in the HVAC system. A gasket is sandwiched between the sensor circuit board assembly and the sensor housing. The gasket is formed with a first opening through which the first branch projects into the first chamber, and a second opening through which the second branch projects into the second chamber. A bottom wall of the sensor housing is formed with a pair of spaced apart ports communicating the first branch with an air flow. The control circuit board assembly includes a transformer and a network of diodes for full wave rectifying a source of AC voltage into a stepped down DC voltage.

In yet another aspect of the invention, a method of detecting air flow so as to control the operation of an accessory item in an HVAC system includes the steps of disposing a first thermistor and a pair of heating resistors in parallel with a second thermistor and a second pair of heating resistors; exposing the first thermistor and a first pair of heating resistors to an air flow and isolating the second thermistor and second pair of heating resistors from the air flow; providing a power regulator circuit to heat the first thermistor and second thermistor to a target temperature greater than a highest specified operating ambient temperature and maintain the temperature of the second thermistor regardless of varying ambient temperature; and interconnecting the power regulating circuit with a sensor monitoring circuit for sensing the difference in temperature of the first thermistor and the second thermistor in the presence of air flow to output a signal operating the HVAC accessory item.

Various other objects, features and advantages of the invention will be made apparent from the following description taken together with the drawings.

BRIEF DESCRIPTION OF THE DRAWINGS

The drawings illustrate the best mode presently contemplated in carrying out the invention.

In the drawings.

DETAILED DESCRIPTION OF THE INVENTION

At the outset of this description, it should be understood that the air flow detection apparatus of the present invention may be employed in any system in which it is desired to monitor or sense changes in the flow or velocity of air. However, in the example to follow, the air flow detection apparatus is particularly useful in triggering the operation of an accessory item, such as an electronic air cleaner, mounted in the duct of a heating, ventilating or air conditioning (HVAC) system upon detecting the presence of an air flow generated by a blower or fan.

Figure 1:
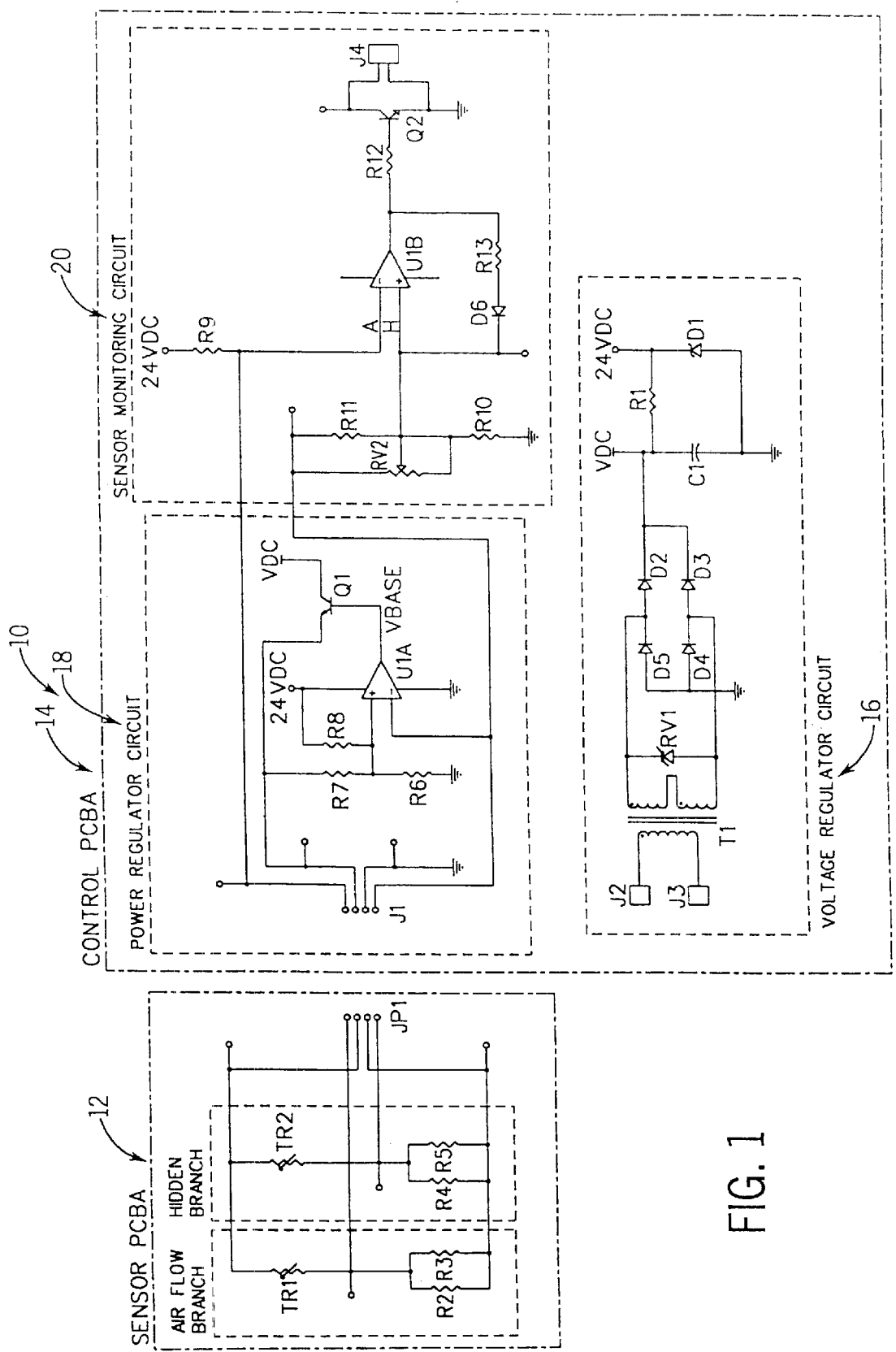
FIG. 1 is a circuit diagram of the air flow detection apparatus.

Referring now to FIG. 1, the air flow detection apparatus 10 of the present invention includes a sensor printed circuit board assembly (PCBA) 12 interconnected with a control printed circuit board assembly (PCBA) 14. The control PCBA 14 is connected to line voltage and produces an output that is active whenever significant air flow is present.

The sensor PCBA 12 includes an air flow branch (i.e. a branch exposed to an air stream) having a thermistor sensing element TR1 connected with a parallel arrangement of heating resistors R2 and R3. Also connected across the air flow branch is a hidden branch (i.e. a branch hidden from the air stream) having a thermistor sensing element TR2 connected with a parallel arrangement of heating resistors R4 and R5.

The control PCBA 14 regulates power applied to the sensor PCBA 12 and monitors the response from the sensor PCBA 12 to determine if air flow is present. The control PCBA 14 is comprised of three main circuit blocks, mainly, a voltage regulator circuit 16, a power regulator circuit 18 and a sensor monitoring circuit 20.

Voltage Regulator Circuit 16

Voltage Regulator Circuit 16 includes a transformer T1 which converts line voltage, (approximately 120 VAC) that comes in via connectors J2 and J3 to low voltage (approximately 24 VAC). Varistor RV1 is connected across the secondary coil of transformer T1 and acts as a voltage surge surpressor to protect the circuit from voltage spikes. The 24 VAC from the secondary is fully rectified by a group of diodes D2, D3, D4, D5. The full wave rectified output from the cathodes of D2 and D3 (with respect to the anodes of D4 and D5) is regulated by capacitor C1 producing the regulated DC voltage source VDC to be used in the regulator circuit 18. The regulated DC voltage source VDC is connected to the cathode of a zener diode D1 through resistor R1. Zener diode D1 draws whatever current is necessary in order to create a voltage drop across resistor R1 that is equal to VDC minus $V_z$ (where $V_z$ is the zener voltage of diode D1). The voltage drop results in a DC voltage source of 24 volts DC to be used by the power regulator circuit 18 and the sensor monitoring circuit 20.

Power Regulator Circuit 18

The power regulator circuit 18 includes connector J1 which interfaces the control PCBA 14 to connector JP1 on the sensor PCBA 12. Differential amplifier U1A increases the base voltage (VBASE) of transistor Q1 which in turn increases the emitter voltage of Q1 until enough power is dissipated in thermistor TR2 and resistors R4 and R5 to raise the temperature of TR2 to a target temperature. As a larger VBASE is applied to transistor Q1, the voltage across thermistor TR2, and resistors R4 and R5 is larger and more power is dissipated in those components. As more power is dissipated in TR2, R4, and R5, the temperature of each component increases. As the temperature of each component increases, the resistance of thermistor TR2 decreases. VBASE is controlled by U1A to cause the resistance of TR2 to decrease to a value that is defined by resistor divider (R6, R7) on a + input of operational amplifier U1A. In steady state operation, the ratio of thermistor TR2 to the parallel combination of resistors R4 and R5 will equal the ratio of resistor R7 to resistor R6, and thereby be held at a constant fixed temperature regardless of ambient conditions. When the ambient temperature is very cold, more power will be dissipated (heat generated) in resistor R4 and resistor R5 than when the ambient temperature is room temperature or greater. Resistor R8 on the + input of U1A insures that amplifier U1A starts in the "on" state during power start up by making the + input of U1A more positive than the − input during the transient conditions present at power up. After power up, the effects of resistor R8 are insignificant on the operation of the circuit and can be ignored.

Sensor Monitoring Circuit 20

For the case of zero air flow, thermistor sensor TR1 will be at the same temperature as thermistor sensor TR2. When TR1 and TR2 are at the same temperature, they will have the same resistance. Since resistor R2 equals resistor R4 and resistor R3 equals resistor R5, when the resistance of thermistor sensor TR1 is equal to the resistance of thermistor sensor TR2, voltage A will be equal to voltage H.

For the case of air flow present, thermistor sensor TR1 will be cooled to a lower temperature than thermistor sensor TR2. When TR1 is cooler then TR2, TR1 will have a higher resistance to TR2. Since resistor R2 equals resistor R4 and resistor R3 equals resistor R5, voltage A is less than voltage H when the resistance of TR1 is greater than the resistance of TR2. The difference in voltage is dependent on the difference in resistance which is dependent on the resistance in temperature, which is dependent on the difference in heat dissipation, which is dependent on the air flow present. Therefore, the difference in voltage A and voltage H is dependent on the amount of air flow present.

Operational amplifier U1B acts as a comparator circuit. When the voltage on the + input of U1B is greater than the voltage on the − input, the high gain of the operational amplifier U1B causes the output to go to the maximum (output is active). When the voltage on the + input is less than the voltage on the − input, the output goes to its minimum.

The sensor monitoring circuit 20 is designed to activate whenever adequate air flow is present. The condition for adequate air flow present is that voltage A (− input) will be some percentage less than voltage H. The specific percentage is determined by the desired sensitivity of the circuit. Resistors R10 and R11 are chosen in such a way that when H*(R10/(R10+R11)) is greater than A (+ input is greater then the − input), the output is active.

Resistor R13 and diode D6 add some positive feedback to provide switching hysterisis. Switching hysterisis is achieved by making the + input of U1B slightly more positive the instant that the output becomes active and thereby reducing the likelihood that slight changes in voltage A and voltage H would cause the output to turn off. Resistor R9 on the + input of comparator U1B insures that the output is "off" if there is no sensor PCBA 12 present by holding the − input more negative than the + input. Potentiometer RV2 is an alternative embodiment that allows for calibration and/or adjustable sensitivity. Adjustable sensitivity is achieved by using RV2 to vary the fraction of voltage H that must be exceeded by voltage A in order to activate U1B. The output of operational amplifier U1B is connected to transistor Q2 through resistor R12. R12 is a current limiting resistor that limits the Q2 base current. When the U1B output is active, transistor Q2 goes into saturation. The external device being controlled by the invention will interface to connector J4 and will be activated whenever Q2 is in saturation. That is, connector J4 connects to the HVAC accessory item so that the latter can be automatically operated whenever air flow is detected.

Figure 2:
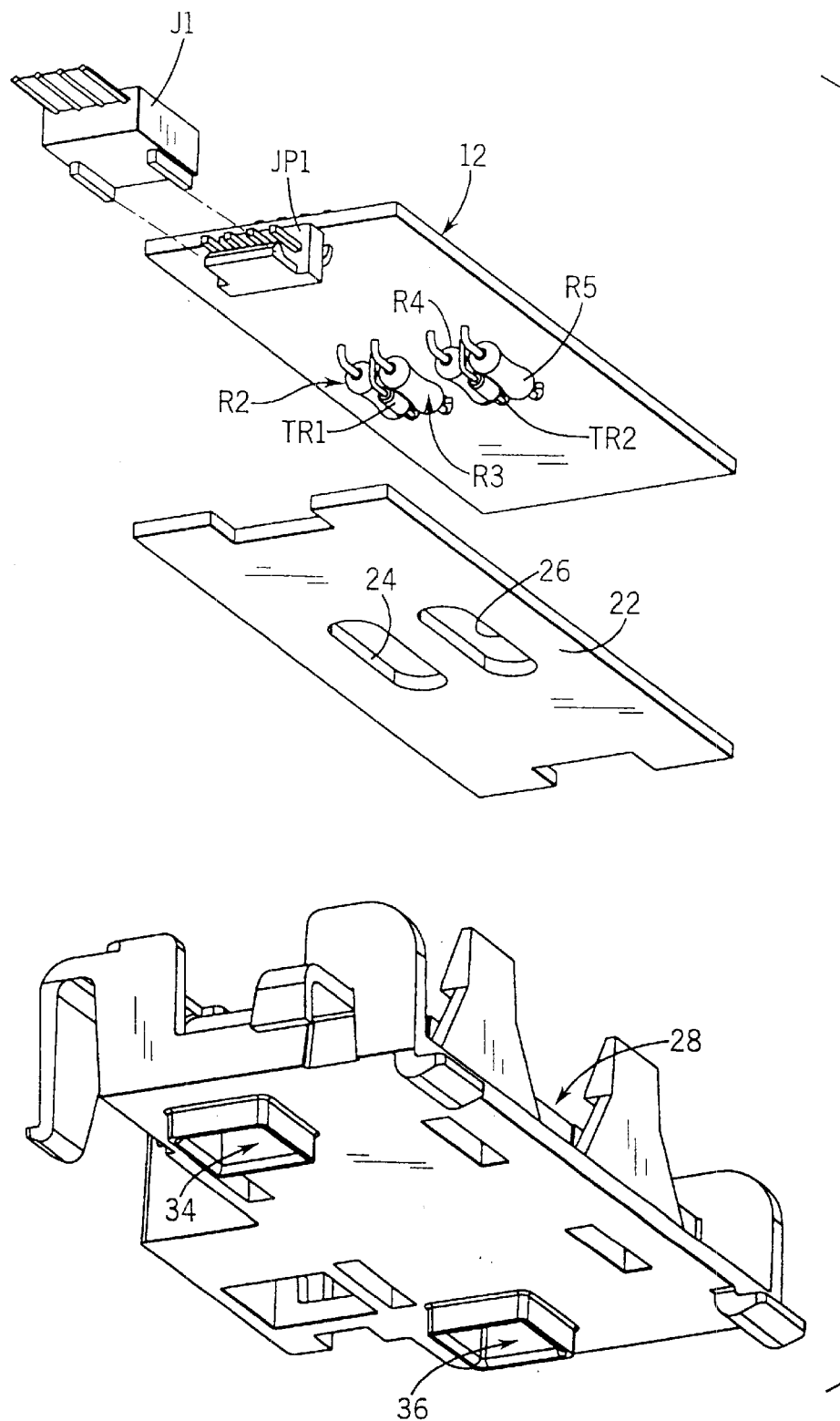
FIG. 2 is an exploded, bottom, perspective view of a sensor housing used in the air flow detection apparatus.
Figure 3:
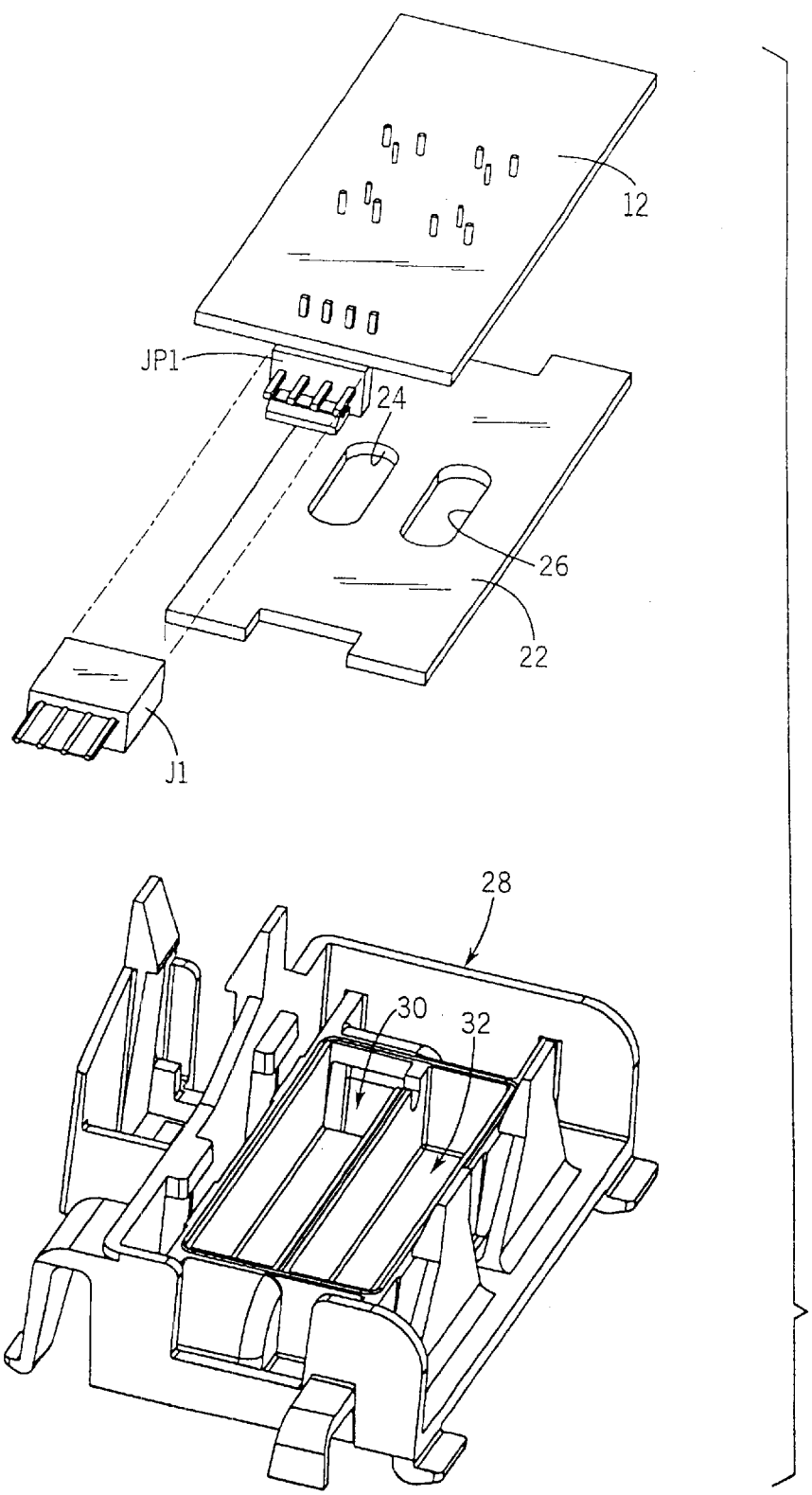
FIG. 3 is an exploded, top, perspective view of the sensor housing.

Referring now to FIGS. 2 and 3, the sensor PCBA 12 overlies a planar gasket 22 formed with two slotted openings 24, 26. The sensor PCBA 12 along with the gasket 22 is enclosed in a sensor housing 28 which is adapted to be mounted in the door assembly of the HVAC accessory, such as an electronic air cleaner, which, in turn, is mounted in a duct of the HVAC system.

The sensor PCBA 12 housed in the sensor housing 28 is comprised of two branches. One branch is housed in a chamber 30 that is exposed to air flow and the other branch is housed in a chamber 32 that is hidden from air flow. Sensor housing 28 is formed with two ports 34, 36 (FIG. 2) which communicate with the air flow branch. A common voltage is applied to each branch whose magnitude is determined by the control PCBA 14. This common voltage results in power being dissipated in each branch. For the case of zero air flow, the resistances of the two branches are the same, the power dissipated in each branch is the same, and the temperatures of the sensor components TR1 and TR2 are the same. For the case of air flow present, the temperatures of the sensor components in each branch are different and the difference is dependent on the magnitude of the air flow. Sensor element TR1 and the heating resistors R2 and R3 comprise the branch that is exposed to the air stream. Matched components TR2, R4 and R5 comprise the branch that is hidden from the air stream.

Figure 4B:
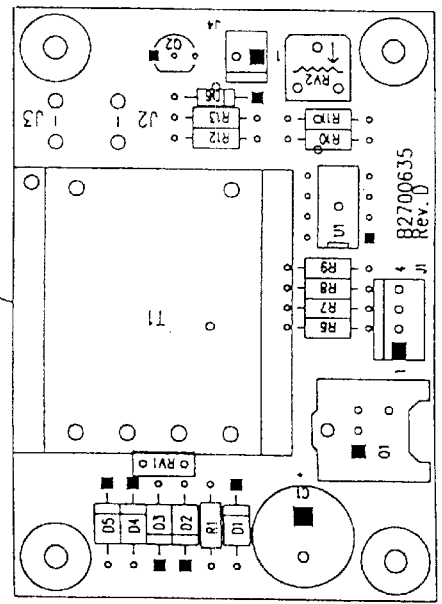
FIG. 4B is a plan view of the control printed circuit board assembly in detail.
Figure 4A:
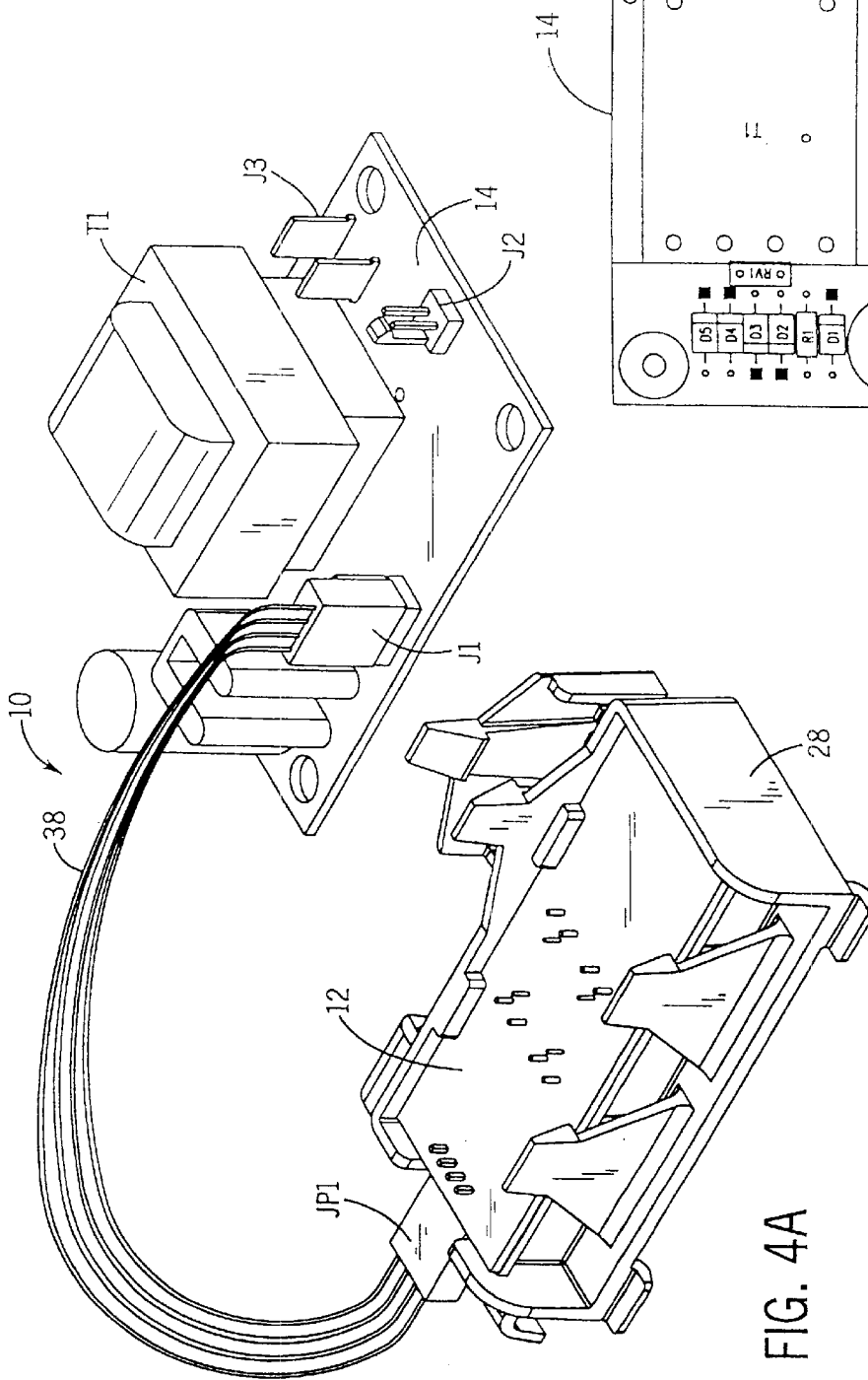
FIG. 4A is a perspective view of the sensor housing with a sensor printed circuit board assembly interconnected to a control printed circuit board.

FIG. 4A illustrates the physical connection by cable 38 connecting the control PCBA 14 to the sensor PCBA 12 enclosed in sensor housing 28. The control PCBA 14 is mounted along with the sensor housing 28 in the door assembly of the electronic air cleaner as noted above. This is a convenient installation which eliminates the need to run additional wiring to the blower motor which was previously required. FIG. 4B is a plan view showing in detail the layout of electrical components on the control PCBA 14 as previously described above.

Air flow is detected by placing the two ports 34, 36 of the sensor housing 28 on opposing sides of a filter media in the electronic air cleaner. The restriction of the filter media causes a portion of the air flow through the filter to be diverted through the channel of the housing 28. If the diverted air flow is great enough, it is detected by the invention and the air flow detection output is activated. The output of the air flow detection apparatus is used to control the power supply of the air cleaner thereby turning on the air cleaner only when there is sufficient air flow through the filter.

The present invention operates by heating the sensor elements TR1, TR2 to a target temperature greater than the highest specified ambient temperature. The temperature of the hidden sensor element TR2 is kept constant in order to ensure that a sufficient differential will be established by the air stream.

In order to get good performance for all temperature combinations, it is necessary to maintain a constant temperature of the hidden sensor element TR2. In order to keep the temperature constant, power is dissipated in the sensing element and heat is added by an external source as needed in order to maintain the target temperature. The air flow detection apparatus is particularly effective over a wide temperature range.

The distinctive characteristic of the new concept is that it uses a combination of self heating and external heat sources to operate at a fixed temperature that is above ambient in order to compensate for varying ambient conditions. The foregoing concept could be used in any application that requires a device to be turned on when air flow is present. Such HVAC accessory items to be controlled by such an air detection apparatus include humidifiers, dehumidifiers and UV lights.

While the invention has been described with reference to a preferred embodiment, those skilled in the art will appreciate the certain substitutions, alterations and omissions may be made without departing from the spirit thereof. Accordingly, the foregoing description is meant to be exemplary only and should not be deemed limitative on the scope of the invention set forth with the following claims.

I claim:

1. An air flow detection apparatus useful in operating an accessory item in an HVAC system comprising:
   a sensor printed circuit board assembly having a first thermistor adapted to be exposed to an air flow and associated with a first pair of heating resistors, and a second thermistor connected in parallel with the first thermistor adapted to be hidden from the air flow and associated with the second pair of heating resistors; and
   a control printed circuit board assembly interconnected with the sensor printed circuit board assembly and having a voltage regulator circuit for applying a DC voltage source to a power regulator circuit and a sensor monitoring circuit interfaced therewith,
   whereby the power regulator circuit enables the first thermistor and the second thermistor to be heated to a target temperature greater than a highest specified operating ambient temperature and maintains the temperature of the second thermistor regardless of the actual temperature, and the sensor monitoring circuit responds to the cooling of the first thermistor in the presence of air flow to output a signal operating the HVAC accessory item,
   wherein the power regulator circuit includes a differential amplifier outputting through a first transistor to control the temperatures of the first thermistor and second thermistor.

2. The air flow detection apparatus of claim 1, wherein the sensor monitoring circuit includes an operational amplifier outputting to a second transistor to sense the difference in temperature between the first thermistor and the second thermistor in the presence of air flow.

3. The air flow detection apparatus of claim 1, wherein the power regulator circuit applies a common voltage across a first branch defined by the first thermistor and the first pair of heating resistors, and a second branch defined by the second thermistor and the second pair of heating resistors.

4. The air flow detection apparatus of claim 1, wherein the first pair of heating resistors are in parallel and the second pair of heating resistors in parallel.

5. An air flow detection apparatus for operating an accessory item in an HVAC system, the apparatus comprising:
   a sensor circuit board assembly and
   a control circuit board assembly interconnected with the sensor circuit board assembly, and having a voltage regulator circuit for supplying a voltage source to a power regulator circuit and a sensor monitoring circuit interfaced therewith, wherein the sensor circuit board assembly has a first branch including a first thermistor connected with a pair of parallel heating resistors and a second branch including a second thermistor connected with a second pair of heating resistors, and wherein the sensor circuit board assembly is enclosed in a sensor housing having a first chamber exposed to an air flow for holding the first branch, and a second chamber hidden from the air flow for holding the second branch, the sensor adapted to be mounted on the accessory item in the HVAC system.

6. The air flow detection apparatus of claim 5, wherein a gasket is sandwiched between the sensor circuit board assembly and the sensor housing, the gasket being formed with a first opening through which a first branch projects into the first chamber, and a second opening through which the second branch projects into the second chamber.

7. The air flow detection apparatus of claim 5, wherein a bottom wall of the sensor housing is formed with a pair of spaced apart ports communicating the first branch with an air flow.

8. The air flow detection apparatus of claim 5, wherein the control circuit board assembly includes a transformer and a network of diodes for fill wave rectifying a source of AC voltage into a stepped down DC voltage.

9. A method of detecting air flow so as to control the operation of an accessory item in an HVAC system, the method comprising the steps of:

disposing a first thermistor and a first pair of heating resistors connected in parallel with a second thermistor and a second pair of heating resistors;

exposing the first thermistor and the first pair of heating resistors to an air flow, and isolating the second thermistor and second pair of heating resistors from the air flow;

providing a power regulator circuit to heat the first thermistor and the second thermistor to a target temperature greater than a highest specified operating ambient temperature and maintain the temperature of the second thermistor regardless of varying ambient temperature; and interconnecting the power regulator circuit with a sensor monitoring circuit for sensing the difference in temperature of the first thermistor and the second thermistor in the presence of air flow to output a signal operating the HVAC accessory item.

* * * * *